No. 852,045. PATENTED APR. 30, 1907.
A. VIVINUS.
CLUTCH.
APPLICATION FILED JAN. 11, 1905.

2 SHEETS—SHEET 1.

Witnesses
Inventor
Alexis Vivinus
By H. A. de Vos
Attorney.

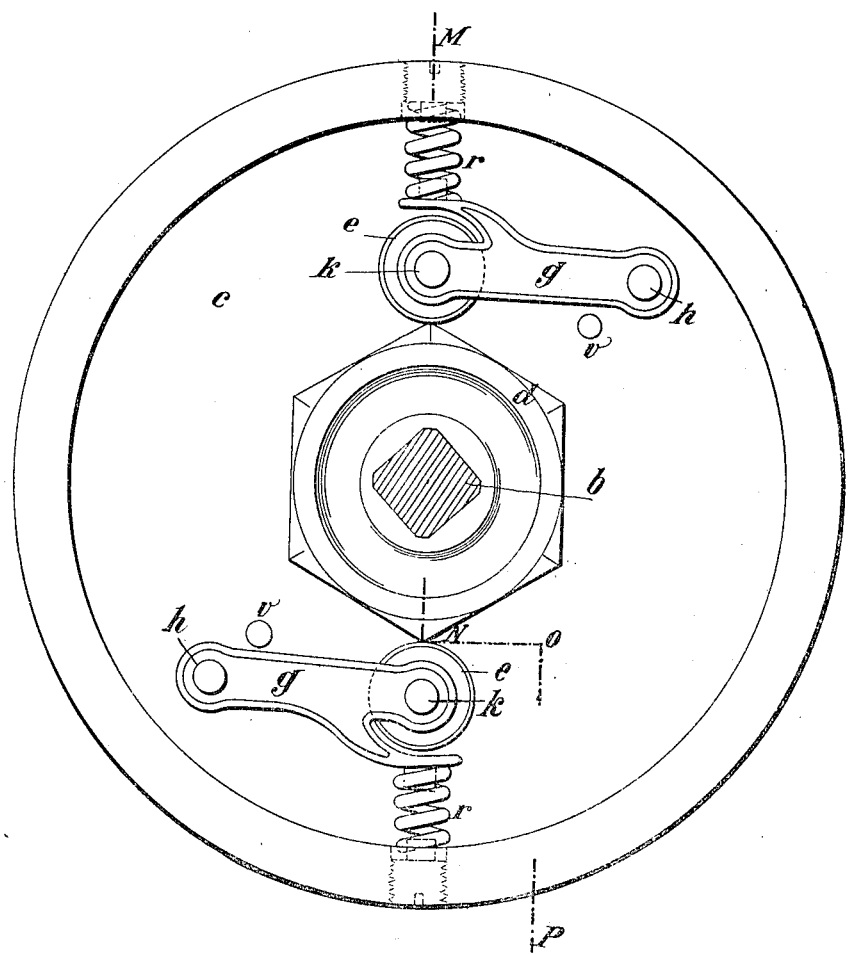

UNITED STATES PATENT OFFICE.

ALEXIS VIVINUS, OF BRUSSELS, BELGIUM.

CLUTCH.

No. 852,045.  Specification of Letters Patent.  Patented April 30, 1907.

Application filed January 11, 1905. Serial No. 240,533.

*To all whom it may concern:*

Be it known that I, ALEXIS VIVINUS, a subject of the King of Belgium, and a resident of Brussels, Belgium, have invented a certain new and useful Clutch, of which the following is a specification.

This invention has reference to an improved clutch by means of which practically any desired proportion of the power supplied by a rotating driving shaft can be transferred to a driven shaft, and that with very little loss of power.

Figure 1:
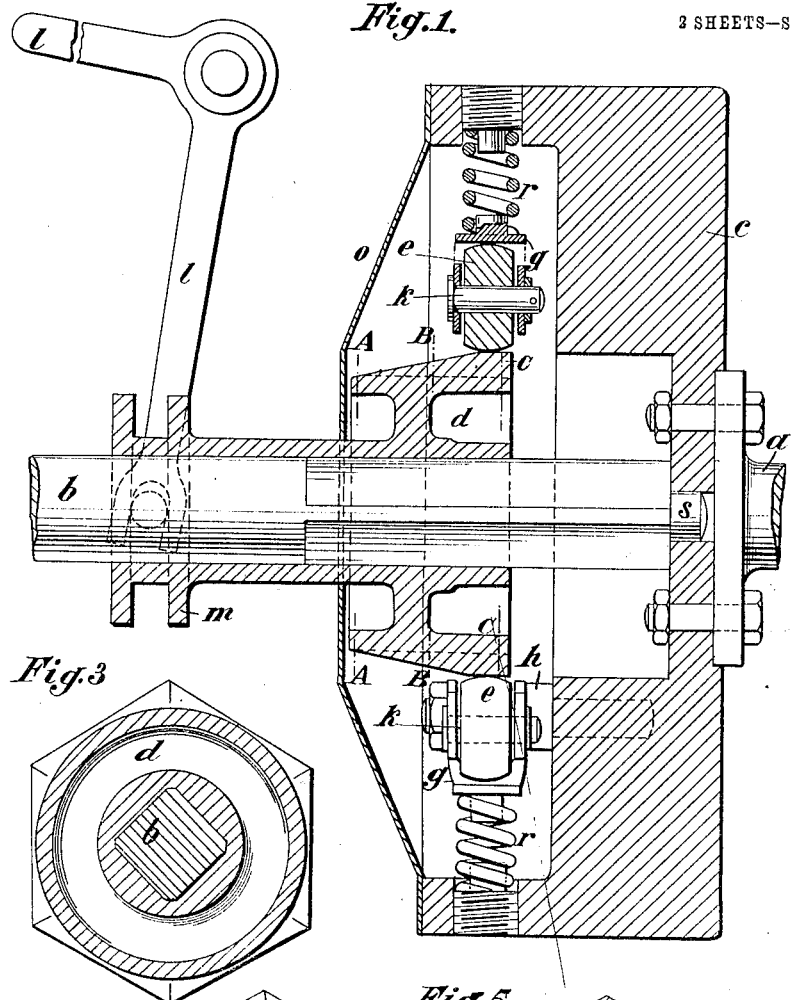
Figure 3:
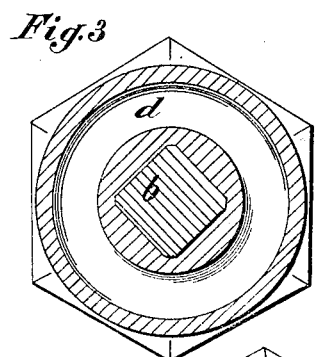
Figure 4:
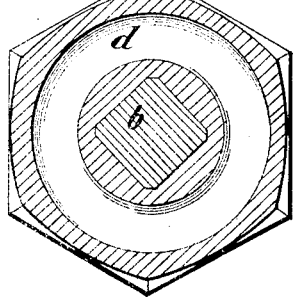
Figure 5:
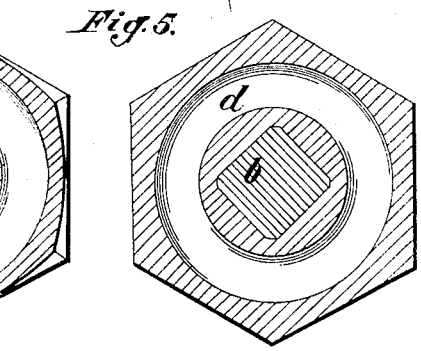

A simple form of my invention is illustrated in the accompanying drawing, Figure 1 of which is a section on the line M, N, O, P of Fig. 2, Fig. 2 is a face view of my improved clutch and Figs. 3, 4 and 5 are sectional views on the lines A—A, B—B, and C—C, respectively, of Fig. 1.

My improved clutch consists of two main parts, one, the driving part, being carried by the driving axle or shaft $a$, and the other, the driven part, being carried by the driven axle $b$ which latter may be connected with the axle $a$ so that it may be rotated at any desired speed, i. e. either at the same speed as that of the motor shaft $a$ or at any desired less speed and practically without any loss of power except that absorbed by the necessary friction between the parts and that due to the resistance to be overcome by the driven shaft.

The driving part consists: (1) of a driving shaft $a$, to the end of which is attached a dished or cupped fly-wheel or disk $c$; (2) of rollers $e$ carried on the free end of each of, say, two levers $g$ which are mounted on pivots $h$ carried by the disk $c$; (3) of springs $r$ acting or pressing on the rollers $e$ or on the levers $g$ and adapted to be regulated or adjusted by screws; (4) of a cover $o$, made of copper or other suitable metal—so that the recess in the disk $c$ may be filled to any desired extent with oil for lubricating the mechanism contained therein.

The driven part consists: (1) of an axle or shaft $b$ having one end squared and having at its extremity a nipple $s$ entering a central aperture in the disk $c$ so as to guide and maintain said shaft concentrically; (2) of a tapering or conical faced clutch piece $d$ formed integrally or provided with a sleeve or the like adapted to slide on the shaft $b$.

The central part of the nut is pierced with a square hole of such size as to slidably fit the squared end of the shaft $b$; and the sleeve with which said conical faced clutch piece is formed or provided has at its end a grooved ring or collar $m$ whereby it, together with the conical faced clutch piece $d$, may be moved longitudinally along the shaft $b$ by means of a lever or pedal $l$.

My improved clutch works as follows:— The conical faced clutch piece $d$ is normally held in the bottom of the recess cut in the disk $c$. In this position the rollers are held out of contact with the conical faced clutch piece $d$ by stop pins $v$. The driving shaft $a$ and, with it, the disk $c$ and rollers $e$ rotate, and when motion is to be communicated to the shaft $b$ the conical faced clutch piece is moved so that its hexagonal part enters more or less between the rollers $e$, which latter by the action of their springs $r$ engage frictionally with said conical faced clutch piece and thus cause the shaft $b$ to rotate, the speed of such rotation as compared with that of the shaft $a$ being dependent on the strength of the springs $r$ and the extent to which the tapered conical faced clutch piece has been moved between the rollers $e$, and inversely of course to the resistance to be overcome by the shaft $b$. During the time that the shaft $b$ cannot turn in unison with the shaft $a$, the rollers will jump the angles of the conical faced clutch piece, giving an effort corresponding to the force absorbed by the shaft $b$ and to the tension of the springs. The roller having cleared the angle, the spring being released will give back the effort absorbed by it, and the force absorbed will in reality thus be that of the axle $b$ augmented by the friction of the rollers and of the moving parts. At the moment when the shaft $b$ absorbs a force less than or equal to that of the pressure exerted by the springs on the rollers, when they are engaged with the more or less flat faces of the conical faced clutch piece, the two shafts $a$ and $b$ will revolve in unison.

The number of faces on the conical faced clutch piece $d$ as well as the number of rollers and springs may be any found most suitable.

My improved clutch works equally well whether the shaft $a$ is rotated in one or the other direction.

Having now fully described my said invention, what I claim and desire to secure by Letters Patent is:—

1. In a clutch, a rotating member, a non-rotating or loose member, a sliding conical faced clutch-piece carried by one member, a plurality of rollers adapted to engage with the conical clutch-piece carried by the other member, and individual spring means for normally forcing each of the rollers toward the conical clutch piece.

2. In a clutch, a rotating member, a non-rotating or loose member, a sliding conical faced clutch-piece carried by one member, a plurality of rollers adapted to engage with the conical clutch-piece carried by the other member, and individual coil spring means for normally forcing each of the rollers toward the conical clutch-piece.

3. In a clutch, a rotating member, a non-rotating or loose member, a sliding conical faced clutch-piece carried by one member, a lever or levers pivoted to the member not carrying the clutch-piece the free ends of which move to and from the clutch-piece, a roller or rollers carried by the levers, a stop for the lever or levers to limit the movement toward the clutch-piece, and a spring or springs normally forcing the lever or levers toward the clutch-piece.

4. In a clutch, a wheel member or head-piece secured rigidly at the end of a shaft, and provided with a hollow upon the side opposite to the shaft, a shaft extending into the central cavity of the wheel member in alinement with the first shaft, a conical-faced clutch-piece rotating with the second shaft slidingly mounted thereon within the cavity of the wheel member, a plurality of levers pivoted within the central cavity of the wheel member, an anti-friction wheel rotating in the plane of the rotation of the clutch carried by each lever, a spring for forcing the levers normally toward the clutch-piece and a stop for limiting the movement of the levers.

5. In a clutch, a wheel member or head-piece secured rigidly at the end of a shaft and provided with a hollow upon the side opposite to the shaft, a shaft extending into the central cavity of the wheel member in alinement with the first shaft, a conical-faced clutch-piece rotating with the second shaft slidingly mounted thereon within the cavity of the wheel member, a lever pivoted within the central cavity of the wheel member, an anti-friction wheel rotating in the plane of the rotation of the clutch carried by the lever, a spring for forcing the lever normally toward the clutch-piece, and a stop for limiting the movement of the lever.

6. In a clutch, a wheel member or head-piece secured rigidly at the end of a shaft and provided with a hollow upon the side opposite to the shaft, a shaft extending into the central cavity of the wheel member in alinement with the first shaft, a conical-faced clutch-piece rotating with the second shaft slidingly mounted thereon within the cavity of the wheel member, a plurality of levers pivoted within the central cavity of the wheel member, an anti-friction wheel rotating in the plane of the rotation of the clutch carried by each lever and a spring for each of the levers normally forcing the same toward the clutch-piece.

7. In a clutch, a wheel member or head-piece secured rigidly at the end of a shaft and provided with a hollow upon the side opposite to the shaft, a shaft extending into the central cavity of the wheel member in alinement with the first shaft, a conical-faced clutch-piece rotating with the second shaft slidingly mounted thereon within the cavity of the wheel member, a lever pivoted within the cavity of the wheel member, and means for yieldingly forcing the lever into operative engagement with the clutch-piece.

In testimony whereof I have hereunto set my hand in presence of two witnesses.

ALEXIS VIVINUS.

Witnesses:
O. SCHER,
GREGORY PHELAN.